(No Model.) 2 Sheets—Sheet 1.
E. S. KEELER.
SEED PLANTER.
No. 454,217. Patented June 16, 1891.
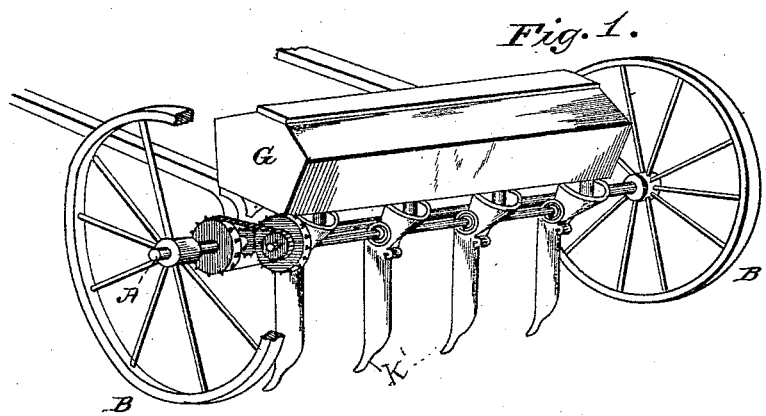
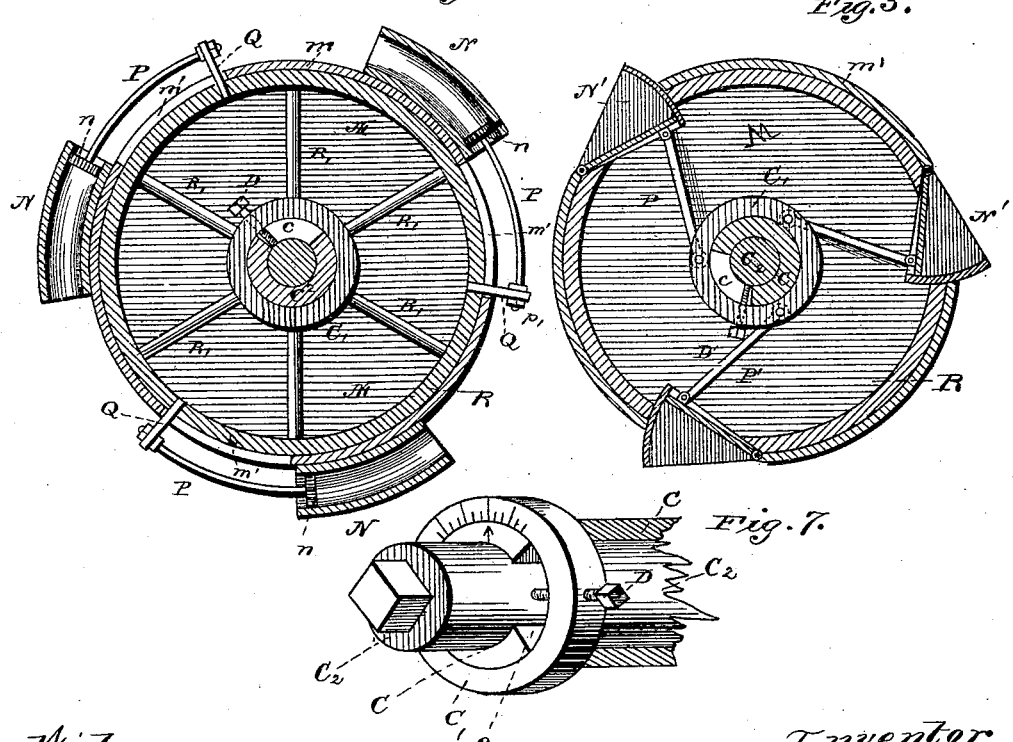
Witnesses
M. B. Harris
J. C. Wilson
Inventor
Elisha S. Keeler
By Whitman + Wilkinson
Attorneys

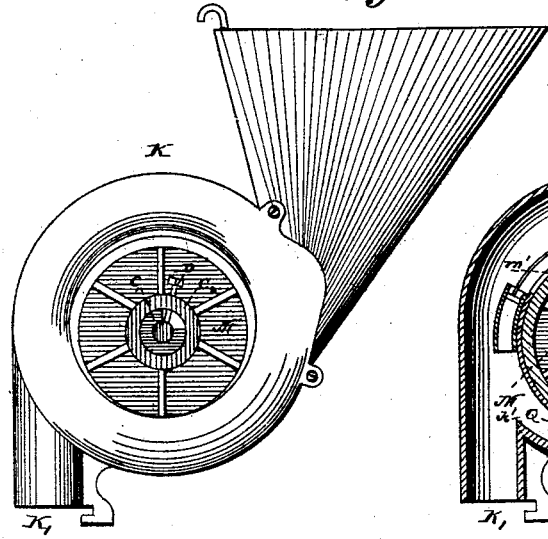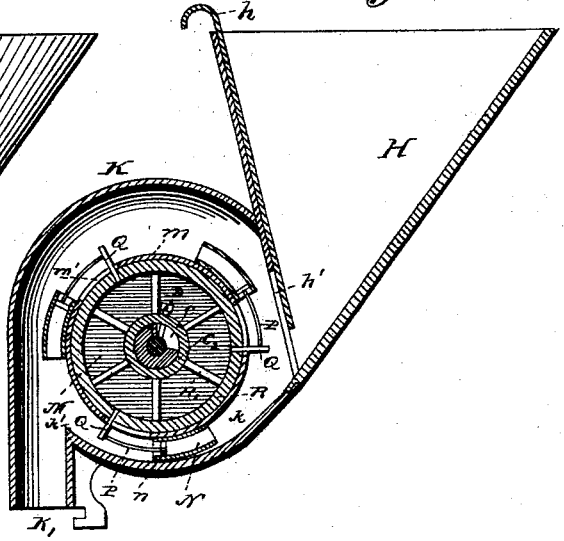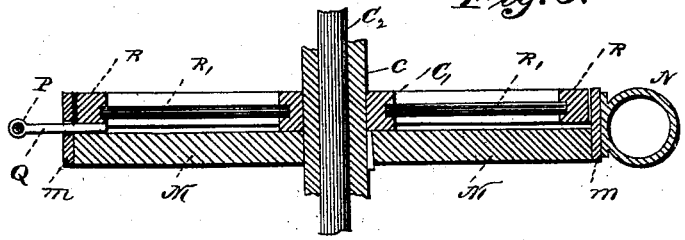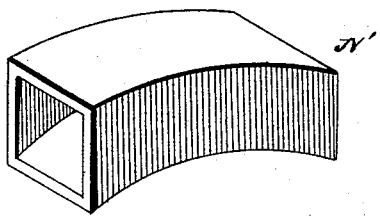

UNITED STATES PATENT OFFICE.

ELISHA S. KEELER, OF TOPEKA, KANSAS.

SEED-PLANTER.

SPECIFICATION forming part of Letters Patent No. 454,217, dated June 16, 1891.

Application filed March 17, 1891. Serial No. 385,370. (No model.)

*To all whom it may concern:*

Be it known that I, ELISHA S. KEELER, a citizen of the United States, residing at Topeka, in the county of Shawnee and State of Kansas, have invented certain new and useful Improvements in Seed-Planters; and I do hereby declare the following to be a full, clear, and exact description of the invention, such as will enable others skilled in the art to which it appertains to make and use the same.

My invention relates to certain improvements in seeders and planters; and it has for its object the providing of a machine which can be readily adjusted for the planting of different kinds of seeds or grains and for planting in drills or in hills at any desired distance apart.

Reference is had to the accompanying drawings, wherein the same parts are indicated by the same letters.

Figure 1 shows a perspective view of a seed-drill capable of planting four rows at a time. Fig. 2 represents a side view of one seed-hopper. Fig. 3 represents a vertical longitudinal section through the same. Figs. 4 and 5 represent vertical sections of the revolving seed-cups and adjusting apparatus as suited for planting several rows at a time. Fig. 6 represents a transverse section of the device shown in Fig. 4. Fig. 7 represents a perspective view, partly in section, of the end of the shaft carrying the feeders. Fig. 8 represents a perspective view of a modified form of bucket. Fig. 9 represents a perspective view, broken away in parts, of the rod, sleeve, and hollow shaft.

The various hoppers, planting-teeth, &c., may be mounted either on the same shaft A with the driving-wheels B or on a separate shaft, and either geared to the first shaft or connected thereto with a chain and sprocket-wheels. I prefer to use a separate shaft with two sets of sprocket-wheels arranged so that the same chain may be used for either set. In this way I obtain variations in the comparative speed of the driving-wheels and feeding-wheels. The shaft may be attached to the frame-work of the machine in any convenient way.

G represents a box for carrying grain from which the hoppers are filled.

H represents a hopper having converging sides, with its smaller end downward. At the rear end of the said hopper I have a slide $h$ as a means of graduating or cutting off the flow of the seed from the hopper when the planter is being moved to or from the field. The flow of seed from the hopper is automatically regulated by the backing up of seed in the opening $h'$, whenever the chamber K is full, to a level with the top of the opening $h'$. The feeding-wheel M has a number of adjustable buckets N on its periphery. The channel or throat $k$ extends from the opening $h'$ at the base of the slide $h$ to a point $k'$, considerably beyond the point directly beneath the shaft or axis of the feeding-wheel. This throat is curved to correspond nearly with the line described by the outer end of the revolving seed-buckets, and constitutes a channel in which the seed or grain coming from the opening $h'$ is met and taken up by the seed-buckets N, carried over the feeding-wheel, and dropped into the delivery or conducting tooth K'. At the point $k'$, where the buckets enter the said channel or throat, it is made of such width and depth that the buckets in passing will fill or fit the channel as nearly as practicable without friction. From such point of entrance toward the base of the hopper the throat is gradually wider and deeper, so that (independent of buckets) the three sides of the channel and the periphery of the feeding-wheel constitute a conchoidal passage, with its smaller end at $k'$ and its larger end between the rear face of the hopper and the feeding-wheel. The said channel is made to extend far enough beyond the vertical line through the shaft so that by reason of its curve upward no seed or grain will reach the opening at the smaller end. This channel may, if preferred, be of uniform size from $k$ a part of the distance toward the opening $h'$.

Each bucket N, Fig. 4, is composed of a section of a curved pipe or hollow ring. The cross-section of this pipe or ring is immaterial, but may be rectangular, as shown in the modification in Fig. 8; but the outer and inner surfaces of said bucket should be circular. Registering with the interior of said bucket I provide a sliding bottom $n$, like a piston. This piston is attached to a rod P, which constitutes a piston-rod protruding from the rear end of the bucket. At its rear end $p'$ this rod is connected to an arm Q, attached to the circumference R of the wheel M, which includes and constitutes the sliding collar C', whose spokes are R' R', and whose hub is on the shaft C. The periphery of this wheel is inclosed by a flange $m$ on the feeding-wheel M. This flange is slotted at $m'$ to give the requisite adjustment to the arms Q, bearing the rods P. This slotted flange is preferably made separately, as a ring of brass shrunk on the feeding-wheel M. To the flange or ring $m$ the buckets N are secured.

For planters to be used to plant more than one row at a time and for grain-drills to be used to plant in several drills at one time, several feeding-wheels may be put on the same shaft, and the rods or arms by which the bottoms of the seed-buckets are adjusted may be operated by any device which will simultaneously adjust the capacity of the buckets in all of the feeding-wheels. Such device I have shown in Figs. 4, 5, 6, and 7, where the shaft C, on which the feeding-wheels are fixed, is made hollow, with a slot $c$ therein under or near each feeding-wheel. A sliding collar C' is placed on said shaft over each of said slots $c$, and the rear ends of the rods P are fixed to the outer ends of the arms Q, as shown by Fig. 4. The connection of these rods and arms may, if preferred, be solid, so that in each case the arm shall be simply a continuation of the rod, and so that both together shall be simply one rod connecting the bucket-bottom $n$ with the collar C'. When hinged bucket-bottoms are used, the inner ends of the arms P are pivoted to the sliding collar, as shown in Fig. 5. Inside of the hollow shaft is placed a rod $C^2$, to which said sliding collars are rigidly connected by screws or bolts D, said screws or bolts moving in said slots in such manner that by turning said rod the operator may at his pleasure adjust the bottoms of the buckets.

Where a number of feeding-wheels on the same shaft are used, I attach all the collars C' rigidly to the central rod $C^2$ by the bolt D. This bolt in the collar nearest one end of the shaft is constructed so as to be used also as a clamp-screw to clamp the collar firmly against the shaft C.

Instead of using D as a clamp-screw, the collar C' may be secured in any desired position by a clamp-screw passing through a slot near the periphery of the collar and screwed into the feeding-wheel. If found necessary to prevent the rod $C^2$ from yielding to torsional strains, both ends of the shaft, respectively, may be secured by clamping, as above indicated. Instead of using one of the collars hereinbefore described for that purpose, a separate collar at any convenient point along the shaft may be used as a gage-collar and to secure the rod $C^2$ and the shaft C in any desired relative position.

The device shown in Fig. 5 represents a modification in my adjustable seed-cups, but with the same sliding-collar adjustment that is shown in Figs. 4 and 7. The hinged bottom-buckets N' therein shown are fully described in my application, Serial No. 382,735, filed February 25, 1891. The hinged bottoms of the said buckets are connected by rods P' to the adjustable collar C' on the hollow shaft C.

It will be evident that there are many modifications of my device that would readily suggest themselves to a skilled mechanic which could be used without departing from the spirit of my invention.

Having thus described my invention, what I claim, and desire to secure by Letters Patent of the United States, is—

1. In a seed-planter, the combination, with a feeding-wheel attached to a rotating shaft, of a plurality of curved seed-cups attached to the periphery of the said wheel, a second wheel adjustably clamped on the said feeding-wheel and carrying radial arms, a piston-rod attached to each of said arms, and a piston on said rod sliding in the said curved seed-cup, substantially as described.

2. In a seed-planter, the combination, with a feeding-wheel attached to a hollow rotating shaft, of a plurality of curved seed-cups attached to the periphery of said wheel, a sleeve on the said hollow shaft adjustably connected thereto, and adjustable connections from said sleeve to the bottoms of said seed-cups, substantially as described.

3. In a seed-planter, the combination, with a rotating shaft, a disk secured thereon, and an adjustable collar on the said shaft, of a seed-cup secured to the said disk, and a movable bottom to the said seed-cup connected to the said adjustable collar, substantially as described.

4. In a seed-planter, the combination, with a rotating shaft, of a disk mounted on said shaft, a collar mounted on said shaft and axially adjustable with reference to said disk, curved seed-cups having circular axes concentric with said disk mounted thereon, movable bottoms sliding in said curved seed-cups, and rods connecting said movable bottoms to said adjustable collar, substantially as described.

5. In a seed-planter, the combination, with a feeding-wheel attached to a hollow rotating shaft having a slot therein, of a plurality of seed-cups attached to the periphery of said wheel, a rod inclosed in the said hollow shaft, a sleeve mounted on the said hollow shaft inclosing the slot therein, a bolt passing through said slot, rigidly connecting said sleeve and rod, and adjustable as a clamp-screw, adjustably clamping the said rod, shaft, and sleeve together, and a system of rods and arms connecting said sleeve to the movable bottoms of said seed-cups, substantially as described.

6. In a seed-drill, the combination, with a plurality of feeding-wheels mounted on a hollow rotating shaft, said shaft having a number of slots therein corresponding to the number of feeding-wheels, of a plurality of seed-cups having movable bottoms attached to each of said feeding-wheels, a rod inclosed in said hollow shaft, an adjustable sleeve inclosing each of said slots, a bolt passing through said slot, rigidly connecting said sleeve and rod, and adjustable as a clamp-screw, clamping said rod, sleeve, and shaft together, and rods connected to said sleeve and to the said movable bottoms of the seed-cups, substantially as described.

7. In a seed-drill, the combination, with a hollow shaft carrying a plurality of feeding-wheels, each of said wheels having one or more seed-cups attached thereto, said shaft being slotted near each of said feeding-wheels, of a rod passing through said hollow shaft, a plurality of adjustable sleeves fitting on said hollow shaft near said slots therein, movable bottoms to said seed-cups attached to said sleeves, and bolts adjustable as clamp-screws passing through said slots and clamping said rod, hollow shaft, and adjustable sleeves, substantially as described.

8. In a seed-drill, the combination, with the hollow shaft C, slotted at $c$ and carrying the seed-cups, of the rod C′, inclosed therein, the sleeve C² loosely mounted on the said shaft and connected to the movable bottoms of the said seed-cups, and the bolt D, passing through said slot, rigidly connecting said sleeve and rod and adjustably clamping together said rod, hollow shaft, and sleeve, substantially as described.

9. In a seed-planter, the combination of the hollow shaft C, feeding-wheel M, curved seed-cups N, piston-bottoms $n$, curved rods P, adjustable collar C′, rod C², and bolt D, substantially as described.

10. In a seed-planter, the combination of the hollow shaft C, feeding-wheel M, slotted ring $m$, curved seed-cups N, piston-bottoms $n$, curved rods P, adjustable collar C′, rod C², and bolt and clamp-screw D, substantially as described.

11. In a seed-drill, the combination, with a hollow shaft, slotted as described and having a plurality of feeding-wheels mounted thereon, each of said wheels carrying one or more seed-cups with movable bottoms, of a number of loose collars mounted on said shaft and corresponding to the number of said wheels, with rods connecting said collars to said seed-cup bottoms, a rod contained in said hollow shaft, bolts passing through the slots in said hollow shaft and rigidly connecting said rod and said collars, one of which is a gage-collar with graduated scale, slot, and clamp-screw, also mounted on said shaft, for adjusting all of said collars on said shaft, substantially as described.

In testimony whereof I affix my signature in presence of two witnesses.

ELISHA S. KEELER.

Witnesses:
  HENRY KEELER,
  W. H. JACOBY.